3,546,132
STEAM-OXYGEN REGENERATION OF SILICA-GROUP III–A—GROUP IV–B CATALYSTS
James B. Godin, Borger, Tex., assignor to Phillips Petroleum Company, a corporation of Delaware
Filed Nov. 27, 1967, Ser. No. 685,781
Int. Cl. B01j *11/04, 11/68*
U.S. Cl. 252—419                                 6 Claims

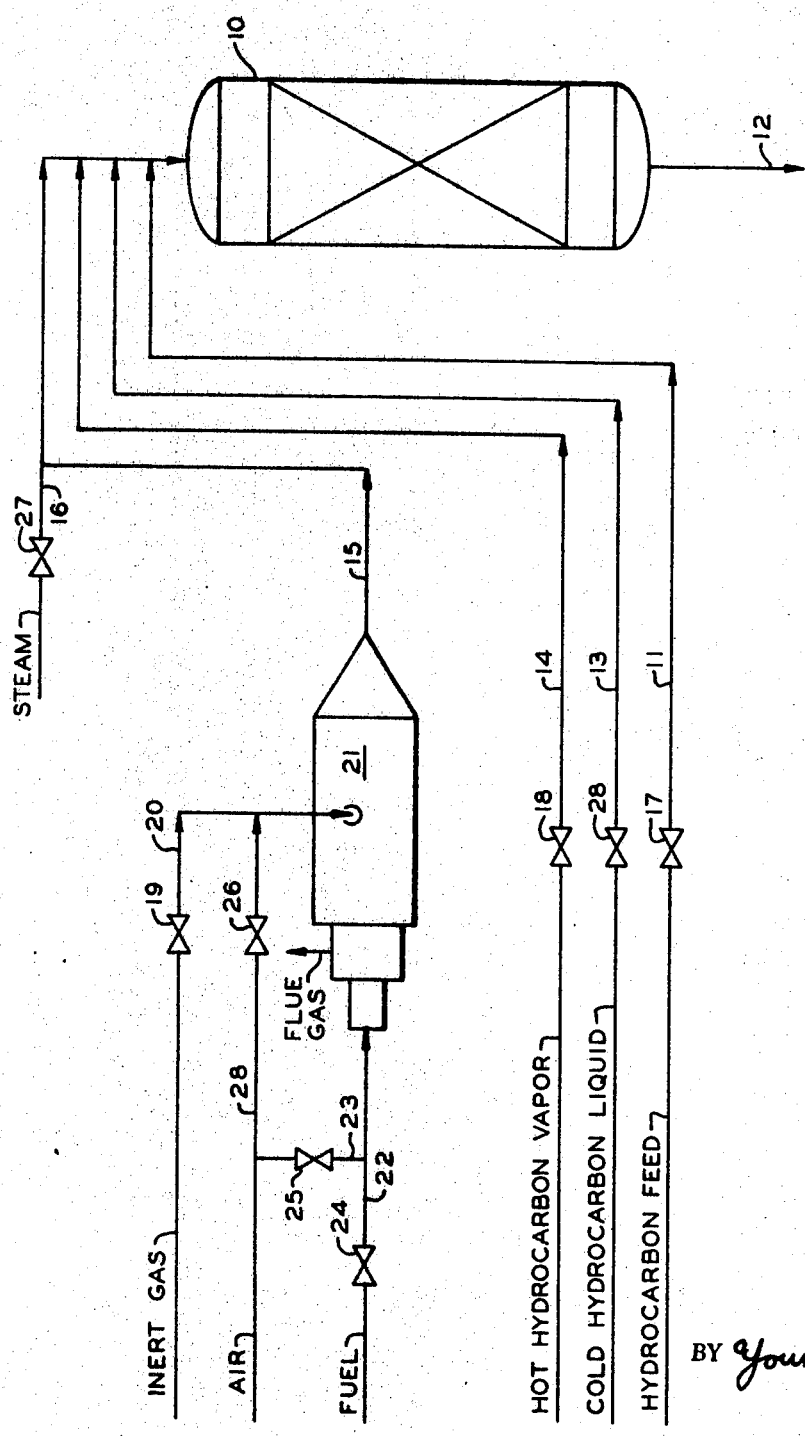

ABSTRACT OF THE DISCLOSURE

Catalyst beds of silica promoted by incorporation of oxides of a metal of Group III–A or IV–B of the Periodic Table are regenerated by the steps of (1) heating and flushing the bed with an inert material to remove the more volatile components therefrom; (2) passing a mixture of steam and air through the bed to effect oxidative stripping of contaminants from the bed; (3) burning the residue of contaminants in the bed; and (4) removing free oxygen and water from the bed.

---

This invention relates to catalyst bed regeneration. In another aspect, this invention relates to an improved method of regenerating a catalyst of silica promtoed by the oxides of a metal of Group III–A or IV–B of the Periodic Table.

In the operation of fixed-bed catalytic polymerization and cracking reactions wherein catalyst regeneration by combustion of carbonaceous deposits is carried out, it is important to remain below a substantially fixed predetermined maximum regeneration temperature. This is because the catalyst generally has a given maximum temperature, which, if exceeded, would adversely affect the activity or physical properties of the catalyst or both. Thus, temperature control, during regeneration, is extremely important for this reason alone, since, otherwise, cost of replacement of catalyst would be prohibitive.

When utilizing catalysts of silica promoted by an oxide or oxides of a metal of Group III–A or IV–B of the Periodic Table as described on page B–2 of the Handbook of Chemistry and Physics, Chemical Rubber Co., 45th edition (1964), the predetermined maximum regeneration temperature is in the range from 1700 to 1800° F. Generally, if such catalyst bed reaches 1800° F. or higher during regeneration, the catalyst life will be substantially cut in half. When the catalyst bed is raised to about 1800° F. during two regenerations, the activity of the catalyst is entirely gone. However, the higher temperatures which are below the maximum regeneration temperature are generally the most efficient for the removal of the combustible deposits in the catalyst bed. Thus, heretofore, it has been necessary to operate at rather high temperatures (approaching 1800° F.) when regenerating the silica catalyst. This regeneration procedure is undesirable in that it requires very close temperature control in order to prevent the regeneration temperatures from exceeding the maximum predetermined temperature and resulting in undesired destruction of catalyst activity.

One object of this invention is to provide a novel catalyst regeneration process.

Another object of this invention is to provide an improved process for regenerating silica-type catalyst efficiently at lower temperatures.

According to one embodiment of this invention, catalysts of silica promoted by incorporation of oxides of metals selected from Groups III–A and IV–B of the Periodic Table are regenerated by the steps of (1) passing at least one hot inert fluid through the catalyst bed to thereby heat the catalyst bed to a temperature in the range of 200–400° F. and remove the more volatile contaminants therefrom; (2) passing a mixture of superheated steam and free oxygen to the catalyst bed to thereby heat the bed to a temperature in the range from about 500 to about 700° F. and effect oxidative stripping of contaminants from the bed; (3) igniting the residue left in the bed to thereby cause a combustion front to move through the bed at a temperature in the range of from about 700 to about 1200° F.; and (4) passing at least one inert gas to the bed to thereby remove free oxygen and water from the bed. This process provides efficient catalyst regeneration at relative low temperatures and thereby results in generally longer catalyst life.

According to another embodiment of this invention, a secondary regeneration process is carried out between successive regeneration processes as described above. This secondary regeneration process comprises heating the catalyst bed to a temperature within the range of from about 400 to about 700° F. and then purging the more volatile components therefrom. The bed is then cooled and put back on stream. This secondary regeneration process can be carried out from 1 to about 6 times before the regeneration process according to the said one embodiment of this invention is repeated. Thus, the secondary regeneration process is used to remove the more volatile contaminants from the bed intermittently between successive regeneration steps which involve the combustion of the contaminant residue.

This invention can be more easily understood from a study of the drawing which is a diagrammatic view of a catalytic reactor adapted for regeneration according to a preferred embodiment of this invention.

Now, referring to the drawing, catalytic reactor 10 is a conventional fixed-bed reactor containing a catalyst bed of silica promoted by the incorporation of an oxide of a metal of Group III–A or IV–B of the Periodic Table. This silica catalyst can be prepared by any method known in the art.

For example, these catalyst can be prepared by first forming a hydrous silica gel or jelly from an alkali-silicate and an acid, washing soluble material from the gel, treating or activating the gel with an aqueous solution of the suitable metal salt, and subsequently washing and drying the treated material. In this manner, a part of the metal, presumably in the form of a hydrous oxide or loose hydroxide compound formed by hydrolysis, is selectively adsorbed by the hydrous silica, and is not removed by subsequent washing. This selective adsorption is attested by a decrease in the metal content of the activating solution as well as a decrease in pH as the activation progresses. The most often used catalyst of this type, at present, is a silica-alumina catalyst, prepared by treating a wet or partially dried hydrous silica gel with an aluminum salt solution, such as a solution of alumina chloride or sulfate, and subsequently washing and drying the treated material. However, as stated above, a hydrolizable salt of a metal selected from Group III–A or Group IV–B of the Periodic System may be utilized. More particularly, salts of indium and thallium in addition to aluminum in Group III–A may be used, and salts of titanium and zirconium in Group IV–B may be used to treat silica gel and to prepare catalyst of this general type. Boron in the form of boric acid, or a soluble borate such as sodium borate, may be incorporated with silica gel. Whether prepared by this method or some modification thereof, the catalysts will contain generally a major portion of silica and a minor portion of the metal oxide. The metal oxide will generally be from one to fifty weight percent of the total catalyst.

The monomer feed stream as supplied to reactor 10 via conduit 11 and removed from reactor 10 via conduit 12. The monomeric feed stream is normally heated (by means not shown in the drawing) to a desired initial reaction temperature before it is introduced into reactor 10. Conduits 13, 14, 15, and 16 supply regeneration fluids to the silica catalyst bed within reactor 10 according to the process of this preferred embodiment.

Thus, when valve 17 in conduit 11 is open, the heated hydrocarbon feed will pass from conduit 11 into the upper region of reactor 10. As the feed stream passes through reactor 10, the desired reaction such as polymerization, or cracking will occur, and the product stream is removed from the lower region of reactor 10 via conduit 12. This catalytic reaction will result in various unwanted carbonaceous deposits forming on the surface of the silica catalyst bed within reactor 10 which reduce the catalyst bed activity. When the maximum allowable amount of carbonaceous deposit has formed within the catalyst bed in reactor 10, valve 17 is closed, reactor 10 is drained, and the regeneration process is begun.

According to the regeneration process of this preferred embodiment, as illustrated in the drawing, valve 18 is opened to allow a hot hydrocarbon vapor to pass into the upper portion of reactor 10 via conduit 14. This hydrocarbon vapor is an inert, nonpolymerizable hydrocarbon (i.e., substantially completely non-reactive in the catalytic environment) selected from alkanes, cycloalkanes, and aromatic hydrocarbons. Examples of suitable hydrocarbons include ethane, butane, pentane, hexane, cyclopentane, cyclohexane, benzene, naphthalene, and the like. The vapor is heated to a temperature sufficiently to heat the silica catalyst within reactor 10 to a temperature in the range of from about 200 to about 400° F. This will result in the more volatile contaminants vaporizing and being purged from the catalyst bed. This heating and purging action will continue for a time sufficient to heat the entire silica bed to the desired temperature and remove the majority of the more volatile contaminants therefrom. For most operations, the hot hydrocarbon vapor is passed through the silica bed from 0.1 to 6 hours. Next, valve 19 is opened to allow an inert gas (i.e., substantially completely non-reactive in the catalytic environment) such as nitrogen or helium and the like to pass from conduit 20 through heater 21, conduit 15 and into the upper region of reactor 10. Heater 21 can be any indirect heat exchange type heating device such as illustrated in the drawing. As illustrated, heater 21 is a double shell type heater having a fuel burner disposed with another shell surrounded by an indirect fluid heating outer shell chamber. Fuel and air are passed to the burner within the inner heating shell via conduits 22 and 23, respectively, the reative proportions of each are controlled by the action of valves 24 and 25, respectively. Thus, heater 21 will heat the inert gas to the temperature of the silica catalyst bed (to a temperature in the range of about 200 to about 400° F.). The inert gas will thereby purge reactor 10 and remove any remaining hydrocarbon vapors therefrom.

Next, valve 10 is closed and valves 26 and 27 are opened to thereby allow air to pass from conduit 28 through heater 21 and into conduit 15 wherein it is admixed with steam from conduit 16. The mixture of steam and air enters the upper portion of reactor 10 and passes through the catalyst bed and out conduit 12. The air is heated by heater 21 and the steam is normally superheated steam maintained at a temperature from about 500 to about 700° F. Valves 26 and 27 are manipulated to yield a steam-air ratio which heats the silica bed within reactor 10 to a temperature within the range of from about 500 to about 700° F. to thereby effect oxidative stripping of contaminants therefrom. The ratio of the air to the steam is low enough to prevent combustion of the contaminants within the bed. This oxidative stripping process will remove volatile contaminants from the bed which were not removed by the hot inert hydrocarbon vapor. This process also heats the bed in preparation for the combustion step. This step will continue until the entire catalyst bed is heated to the desired temperature and until the desired amount of volatile contaminants are stripped therefrom (usually from 0.1 to 8 hours).

Next, the combustion process is begun by increasing the flow of heated air through conduit 15 passing to the upper region of reactor 10. Thus, the flow of heated air through conduit 15 is increased until combustion is initiated in the upper region of the silica bed withn reactor 10. The combuston front will thereafter move from the top to the bottom of reactor 10, and will be maintained at a temperature in the range of from about 700 to about 1200° F. by adjusting the flow of air through conduit 15, for example.

After the combustion zone or front has passed through the entire length of the catalyst bed, the bed can be purged and cooled with inert material and put back on stream. However, it is preferred that a secondary combustion process be carried out by closing valve 27 and allowing heated air to pass through column 10 via conduit 15. The heated air will maintain the column at a temperature within the range of about 700 to about 1100° F., preferably about 1100° F. for a time sufficient to combust any remaining carbonaceous residue that was not burned by the steam-air combustion step described above. The heated air will generally pass through the column from a period of about 0.1 to about 4 hours.

If the secondary combustion step is carried out, the column is then dried and purged with inert gas, allowed to cool, and then put back on stream. A preferred method of drying and cooling the column comprises closing valves 24 and 25 while leaving valve 26 open to thereby allow cool air to pass through reactor 10 until the reactor is cooled to a temperature that is preferably lower than about 400° F., preferably about 300° F.

Next, valve 26 is closed and valve 19 opened to thereby allow cool inert gas to sweep through column 10 and remove any free oxygen therefrom. Next, valve 19 is closed and valve 18 is opened to allow hot hydrocarbon vapor (maintained generally at a temperature within the range of about 200 to about 400° F.) to pass through column 10 and remove any remaining water vapor therefrom. If it is desired to place reactor 10 immediately back on stream after regeneration, then valve 18 is closed and valve 28 is opened to allow cold liquid hydrocarbon to flush through the silica catalyst bed. The cold liquid hydrocarbon is vaporized as it is passed through the catalyst bed until the bed is cooled to a temperature of 100° F. or lower. The catalyst bed has now been completely regenerated and cooled, and is ready to be placed back on stream.

It must be noted that the use of the inert, hot hydrocarbon vapor is not necessary to carry out the regeneration process of this invention. However, the use of hydrocarbon vapor as inert purging and stripping material is preferred. For example, the regeneration process of this invention can be carried out by (1) passing a heated gas from conduit 15 through reactor 10 to thereby heat the catalyst bed to a temperature within the range of from about 200 to about 400° F.; (2) passing a mixture of steam and air through the catalyst bed to thereby heat the catalyst bed to a temperature in the range of from about 500 to about 700° F.; (3) increasing the flow of air to the catalyst bed to thereby cause combustion front to the bed at a temperature within the range of from about 700 to about 1200° F.; and (4) passing an inert gas from conduit 15 from the catalyst bed to thereby remove free oxygen and water vapor therefrom. Furthermore, it should be noted that this invention is not limited to use of air, but any free oxygen-containing gas can be used to effect the above-recited regeneration steps.

According to the said second embodiment of this invention, secondary regeneration steps can be carried out between successive regeneration processes as recited above. Thus, after the catalyst bed has been regenerated according to the above-described process and put on stream, and thereby become at least partially contaminated with carbonaceous deposits, a secondary regeneration process can be carried out. This secondary regeneration process can be repeated successively from 1 to 6 times to regenerate the contaminated bed before the above-described regeneration process need be repeated. This secondary regeneration can comprise passing a hot inert nonfree-oxygen containing and nonwater-containing gas through the catalyst bed to thereby heat the catalyst bed to a temperature within the range of from about 500 to about 700° F. However, preferably, the secondary regeneration process is carried out by first opening valve 18 to thereby allow hot hydrocarbon vapor to pass through reactor 10 and thereby heat the silica catalyst bed to a temperature within the range of from about 200 to about 400° F. and remove the occluded and the more volatile contaminants therefrom. Then, valve 18 is closed and valve 27 opened to allow superheated steam to pass through the catalyst bed and heat the catalyst bed to a temperature within the range from about 500 to about 700° F. thereby stripping volatile components therefrom. Next, the catalyst bed is urged by closing valve 27 and opening valve 26, thereby passing cool air through column 10 and cooling the silica catalyst bed. Valve 26 is then closed and valve 19 opened to thereby allow cool inert gas to pass through reactor 10 and purge any residual free oxygen therefrom. Valve 19 is then closed and then valve 28 opened to thereby allow preferably dry cold hydrocarbon liquid to purge the silica catalyst bed, cool the bed, and remove any remaining water therefrom. Reactor 10 can then be put back on stream. Further, it must be noted that the utilization of the secondary regeneration process, according to the second embodiment of this invention, is not necessary to carry out the basic regeneration process of this invention.

The following example will help to ilustrate the invention although it is not to be construed as limitive thereof.

EXAMPLE

A catalytic reaction and regeneration apparatus similar to the apparatus diagrammatically illustrated in the drawing was utilized for the regeneration process of this example. Catalytic reactor 10 was 16 feet high and 3 feet in diameter and had 125 cubic feet of silica-alumina catalyst in the form of pellets therewithin. The catalyst contained about 12 weight percent alumina and the rest silica gel. Temperature sensing elements were positioned every foot along the length of the catalyst bed. A high purity butene-1 stream containing approximately 1.5 weight percent isobutylene impurity and maintained at about 100° F. and 200 p.s.i.g. was charged as feed through conduit 11. The silica-alumina catalyst selectively polymerized the isobutylene in the high purity butene-1 stream, and butene-1 plus polymer was reromved from reactor 10 via conduit 12.

After the polymerization proceded for about 2 days, the catalyst became inactive as evidenced by the low concentration of polymer (and high concentration of isobutylene impurity) in the product stream from conduit 12. Valve 17 was then closed, reactor 10 drained, and the catalyst bed regenerated as described below.

Valve 18 was opened to allow hot butane vapor maintained at about 300° F. to pass through reactor 10 at 16,000 standard cubic feet per hour until the temperature of the entire catalyst bed was 275° F. Valve 18 was then shut, and valve 19 opened to thereby allow nitrogen to pass through heater 21, become heated to about 300° F. and pass through reactor 10. The nitrogen passed through reactor 10 at 5,000 standard cubic feet an hour for one hour. Valve 19 was shut and valves 26 and 27 were opened to thereby allow a mixture of superheated steam and heated air to pass through reactor 10. This mixture consisted of 500 pounds per hour of air at 1100° F. and 200 pounds per hour of superheated steam at 475° F. This process continued for 3 hours until the entire catalyst bed was heated to 600° F.

Next, the quantity of superheated steam was increased to 600 pounds per hour and the quantity of air was increased until a combustion front was initiated at the top of the silica-alumina bed in reactor 10. The combustion front then passed from the top to the bottom of the silica-alumina bed at about 1100° F. After the combustion zone had gone through the bed, valve 27 was closed and 7,200 standard cubic feet an hour of heated air was passed through the catalyst bed until the entire catalyst bed was uniformly maintained at a temperature of 1100° F. Next, valves 24 ad 25 were closed thereby extinguishing the burner in heater 21 and allowing cool air to pass through reaction 10 via conduit 15. The cool air was allowed to pass through reactor 10 until the entire catalyst bed was cooled to about 300° F. Valve 26 was then closed and valve 19 opened to allow 5,000 standard cubic feet an hour of nitrogen to pass through reactor 10 for 1 hour. Next, valve 19 was closed and valve 18 was opened to allow 16,000 standard cubic feet an hour of dry hot butane vapor to pass through reactor 10 for 2 hours in order to dry the bed. The silica-alumina was then at a temperature of about 275° F. and was completely regenerated. Before reactor 10 was put back on stream, valve 28 was opened to allow 500 gallons per hour of cold butane to pass through reactor 10 until the bed was cooled to a temperature between 90 and 100° F.

The silica-alumina catalyst regenerated according to the process of this invention will have an active life of from 1.5 to three times greater than catalyst bed regenerated by conventional combustion processes.

I claim:
1. A method of regenerating a catalyst bed of silica promoted by the incorporation of an oxide bed of a metal selected from Groups III–A and IV–B of the Periodic Table, which catalyst bed has been used for polymerization and which has become contaminated with combustible deposits of polymer and has at least partially lost its activity, comprising in sequence the steps of:
 (a) passing at least one hot inert gaseous vaporizable hydrocarbon fluid selected from alkanes, cycloalkanes and aromatics through said bed to thereby heat said bed at a temperature in the range of about 200 to about 400° F. and thereby remove the more volatile contaminants therefrom;
 (b) passing a mixture of steam and free oxygen through said bed to heat said bed to a temperature in the range of from about 500 to about 700° F., to strip polymer contaminants therefrom the steam-to-oxygen ratio of the mixture being sufficiently high to prevent combustion within the bed;
 (c) increasing the flow of said free oxygen in contact with said steam to initiate a combustion front and cause said combustion front to move through said bed at a temperature in the range of about 700 to about 1200° F.; and
 (d) passing at least one inert gaseous fluid containing substantially no water or free oxygen through said bed to thereby remove substantially all of the free oxygen and residual water therefrom.

2. The process of claim 1 further comprising cooling said bed to a temperature less than about 100° F. by passing a cool inert gaseous fluid containing substantially no water and free oxygen through said bed.

3. The method of claim 1 wherein step (a) comprises passing a vaporizable hydrocarbon selected from alkanes, cycloalkanes, and aromatics through said bed to thereby heat said bed to said temperature and then passing an inert gas through said bed to flush said hydrocarbon therefrom.

4. The method of claim 1 further comprising passing a heated free oxygen containing gas through said bed to thereby maintain said bed at a temperature from about 700 to about 1100° F. after said combustion front has passed through said bed and before substantially all of said free oxygen and said water is removed therefrom.

5. The method of claim 1 further comprising between steps (c) and (d) cooling said bed to a temperature of 400° F. or lower by passing cool air therethrough.

6. The method of claim 1 wherein step (d) comprises passing an inert gas through said bed to remove substantially all of said free oxygen therefrom, and then passing an inert gaseous hydrocarbon fluid selected from alkanes, cycloalkanes, and aromatics through said bed to thereby remove residual water therefrom.

References Cited

UNITED STATES PATENTS

| 2,206,021 | 7/1940  | Blunck          | 252—416X   |
| 2,371,610 | 3/1945  | Daugherty, Jr.  | 260—683.15 |
| 2,382,472 | 8/1945  | Frey            | 252—419    |
| 2,454,901 | 11/1948 | Vinyard et al.  | 252—416    |
| 2,866,747 | 12/1958 | Kearby et al.   | 252—411X   |

DANIEL E. WYMAN, Primary Examiner

P. E. KONOPKA, Assistant Examiner

U.S. Cl. X.R.

208—120; 252—411, 416; 260—683.15

17751

UNITED STATES PATENT OFFICE

CERTIFICATE OF CORRECTION

Patent No. 3,546,132         James B. Godin          Dated  Dec. 8,

It is certified that error appears in the above-identified patent and that sa
Letters Patent are hereby corrected as shown below:

Column 6, line 39, after "oxide" delete "bed".

Signed and sealed this 20th day of April 1971.

(SEAL)
Attest:

EDWARD M.FLETCHER,JR.                WILLIAM E. SCHUYLER, JR.
Attesting Officer                    Commissioner of Patents